April 12, 1949.  M. J. O. LOBELLE  2,467,045
TOWING AND RELEASE MECHANISM
Filed March 21, 1944  5 Sheets-Sheet 2
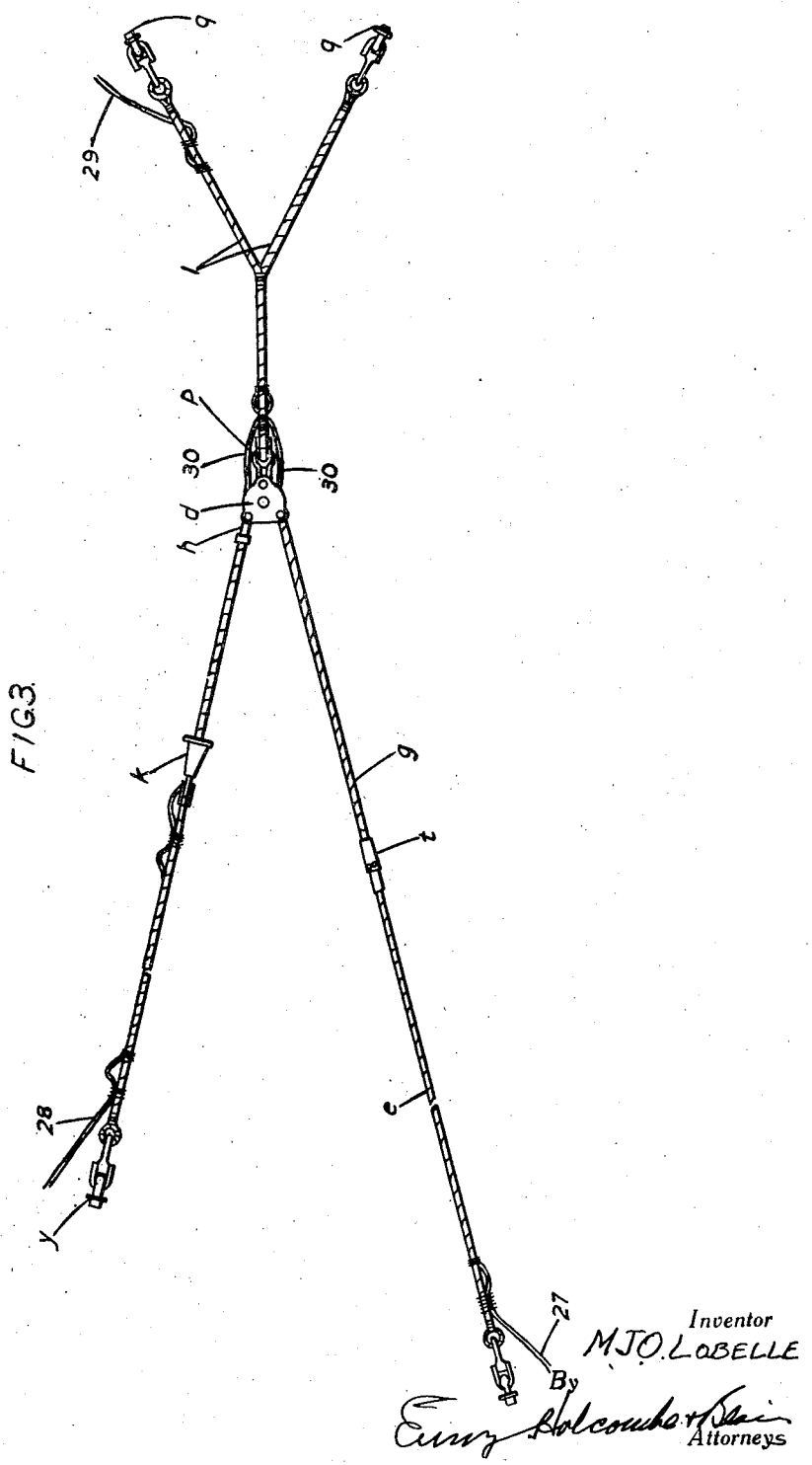

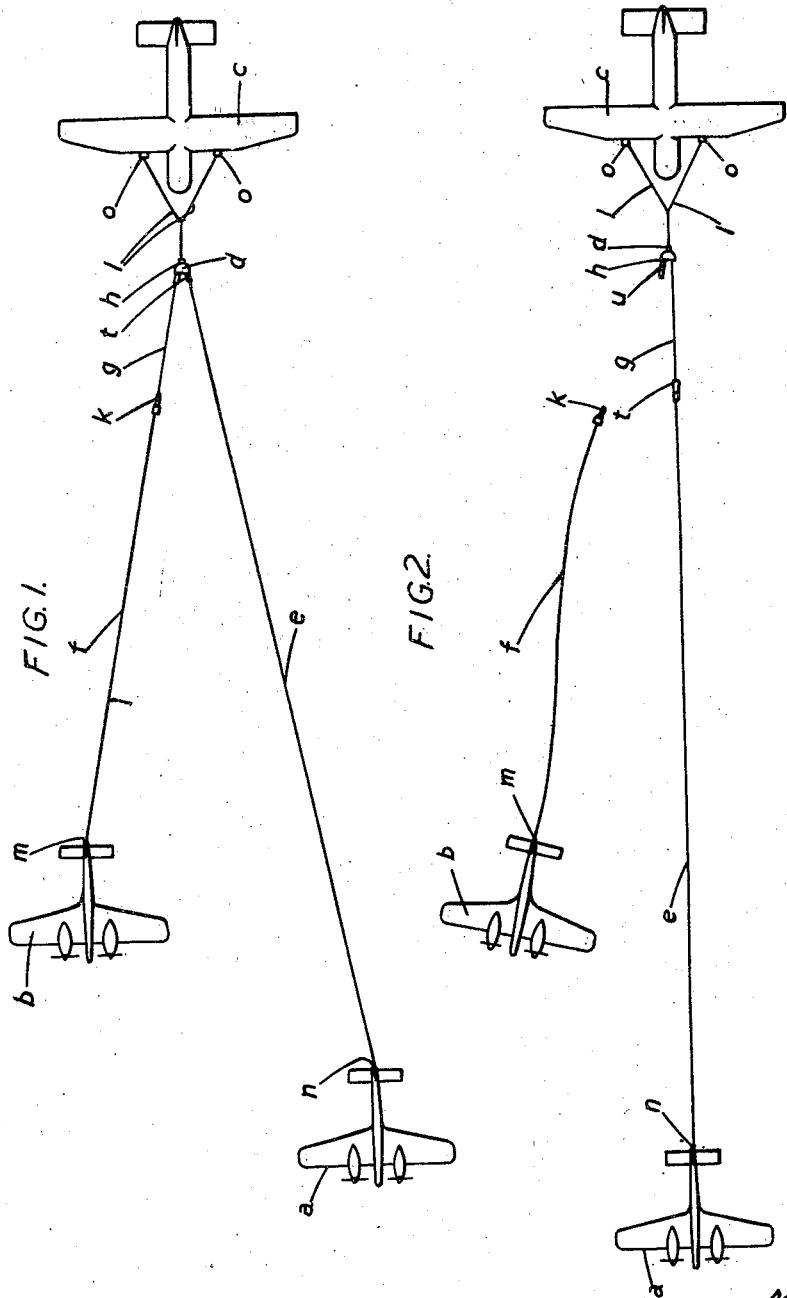

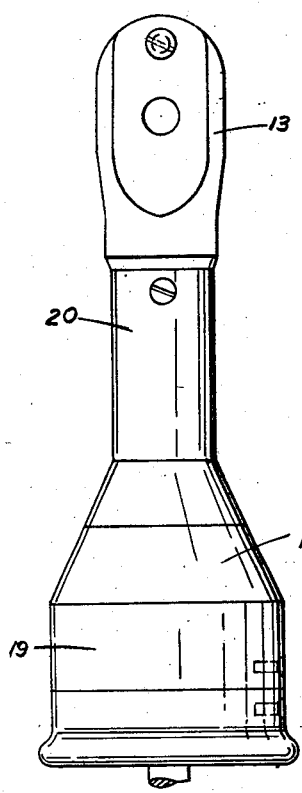
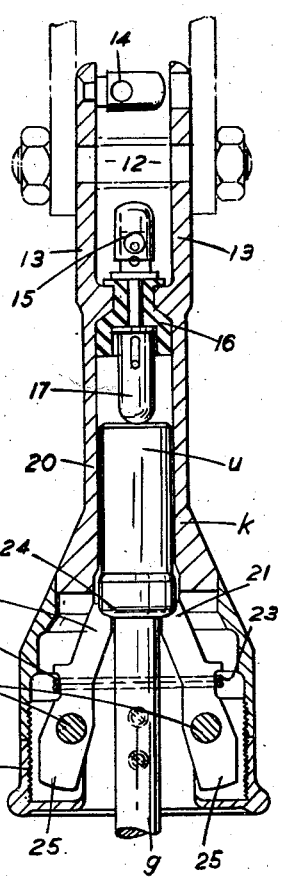
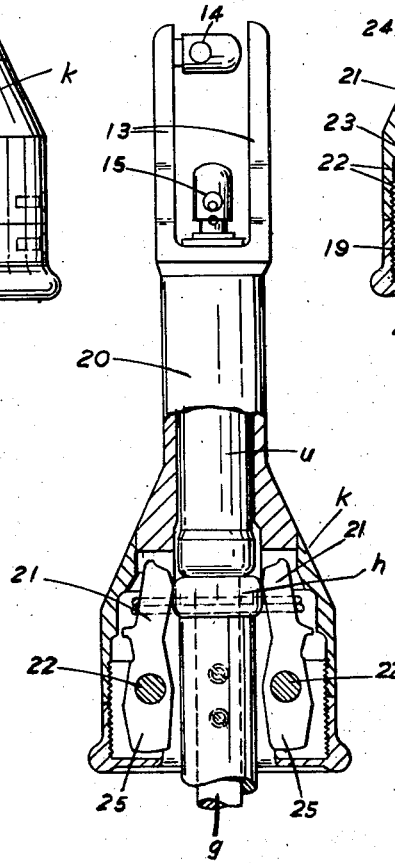

April 12, 1949.　　　M. J. O. LOBELLE　　　2,467,045
TOWING AND RELEASE MECHANISM
Filed March 21, 1944　　　　　　　　　5 Sheets-Sheet 4
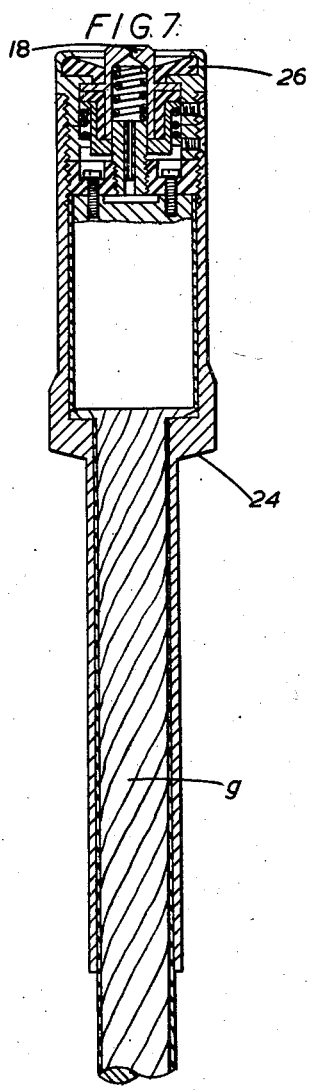
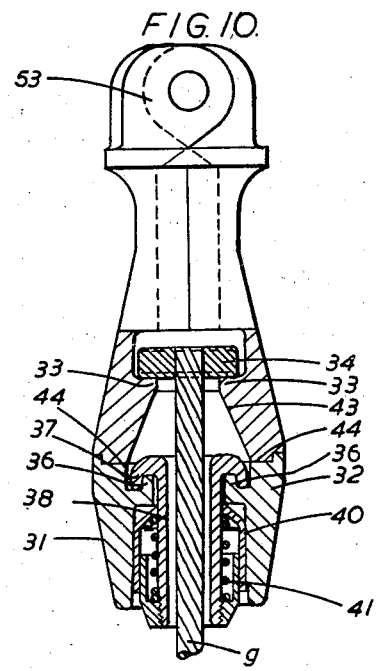
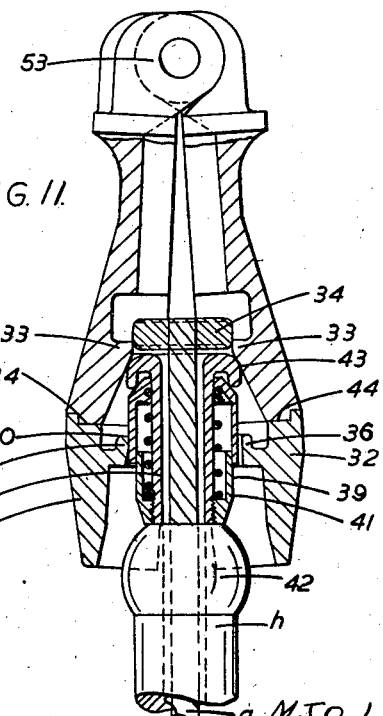
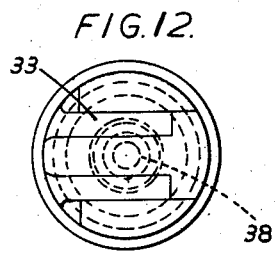
Inventor
M.J.O. LOBELLE
By
Attorneys

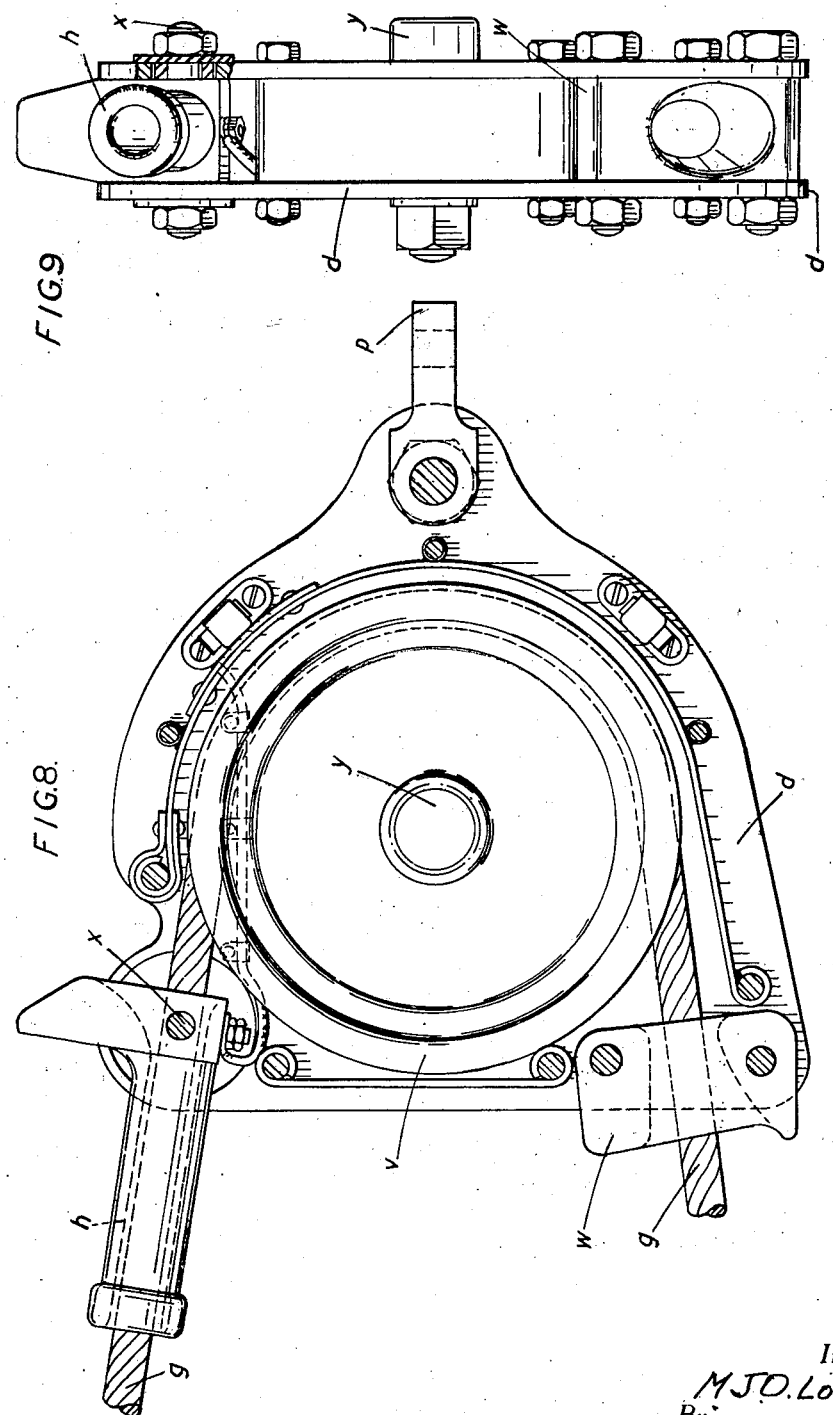

Patented Apr. 12, 1949

2,467,045

UNITED STATES PATENT OFFICE 2,467,045

TOWING AND RELEASE MECHANISM

Marcel Jules Odilon Lobelle, Slough, England, assignor to M. L. Aviation Company, Limited Application March 21, 1944, Serial No. 527,435
In Great Britain April 6, 1943

10 Claims. (Cl. 244—3)

This invention relates to towing and release mechanism adapted for use in connection with the towing of aeroplanes but also applicable to many other uses where towing has to be effected or a load has to be carried and the towing connection has to be released or disconnected at will. As applied to the towing of gliders and the like by aeroplanes the invention is particularly useful for cases in which two aeroplanes acting as tugs are necessary to initiate the flight of a glider, but one of the tugs can be disconnected, leaving the other to carry on when the glider is airborne and is at a sufficient height above the ground. It will be convenient to describe the invention as applied to this purpose although it is not limited thereto.

When two aeroplanes serving as tugs are connected by cables to a single glider, the connection is generally made by the well known method of carrying the cables on the tugs around a pulley on a junction plate from which connections are taken to the glider. If the cable connection to one of the tugs were to be released in this case, allowing one end of the cable to run back to the junction plate while the other end was pulled out by the principal tug, there would be too long a period during which no pull would be applied through the cable to the junction plate, while the connections would sag, and the control would be lost. On the other hand there is no objection to a momentary release of the tension in disconnecting the assistant tug if the pull is almost immediately taken up by the principal tug. It is the object of the invention to enable this result to be attained in a satisfactory manner.

According to this invention the length of cable from the assistant tug to the junction plate is interrupted in the neighborhood of the junction plate by the insertion of a release mechanism which will operate automatically if the assistant tug is throttled down so that the pull in its cable is reduced, allowing the principal tug to go ahead. This will bring the release mechanism in the cable leading from the assistant tug up against a suitable member connected to the junction plate which serves automatically to effect the release at this point, leaving the principal tug to carry on with the towing operation through its own cable connected to the junction plate. The assistant tug is left with its own length of cable hanging free which it can release and drop by operating the release mechanism on the aeroplane, the length of cable being generally allowed to fall while the towing aeroplane is over the aerodrome so that it comes to ground and is recovered for future use.

The release mechanism operated by contact with a part attached to the junction plate may take various forms provided that it is sufficiently strong and reliable to effect the towing even while the cables are dragging along the ground at the aerodrome, and that the connection can be released when required while under tension when in flight. The coupling must in fact be of such a shape and so constructed that it will withstand rough treatment without disconnection while it is bumping over the ground until the tugs and glider are air-borne, and yet can be released with certainty when the assistant tug takes action to effect disengagement. The release will occur while the coupling is under considerable tension because the assistant tug does not cease to pull suddenly but only reduces its pull somewhat so as to allow the principal tug to take over the towing duty.

In the accompanying drawings which illustrate some forms of construction according to the invention:

Figure 1 is a diagram of the twin tug towing system in use;

Figure 2 is a similar view showing the conditions just after the assistant tug has caused its cable connection to be released;

Figure 3 shows the cables and junction plate to a larger scale;

Figure 4 is a view in elevation of one form of the coupling on the end of the cable connected to the assistant tug;

Figure 5 is a sectional view corresponding to Figure 4;

Figure 6 shows the parts of Figure 5 at the moment of release;

Figure 7 is a sectional view of the spigot member for this coupling;

Figure 8 is a face view of a suitable form of junction plate, with its upper plate removed;

Figure 9 is an end view of the junction plate;

Figure 10 is a sectional elevation of another form of the coupling;

Figure 11 is a partial sectional view showing how the coupling of Figure 10 effects release; and Figure 12 is a plan view thereof.

Referring first to Figures 1 and 2, $a$ is the principal tug, $b$ the assistant tug, and $c$ the glider being towed. The junction plate $d$ is connected to the glider by a bridle $l$ which is generally of hemp rope. The cable $e$, generally of steel, is connected to the tug $a$, and cable $f$ is connected to the tug $b$. Between these two cables is a length of cable g which passes through the junction plate and has a stop or buffer t at one end where it is connected to cable e, while its other end carries a spigot member u hereinafter described (Figure 7) for engaging with a coupling k (Figures 4 and 5) at the rear end of cable f. At the junction plate the cable g passes round a pulley v (Figures 8 and 9) and through a hollow plug member h which serves to release the coupling k when this is engaged by the plug member h as hereinafter described (Figure 6.) So long as the assistant tug is in action at the start of a flight, the buffer or stop t is generally kept up against the junction plate d as in Figure 1, because the assistant tug b is then pulling rather more strongly than the principal tug a, so as to make sure that the coupling k is kept away from the plug member h on the junction plate. The length of cable g however allows of some to-and-fro motion of the cables relative to the junction plate without operating the release device in case the principal tug tends to go ahead momentarily.

When the tugs a and b and the glider c are in flight and at a sufficient altitude for safety, the pilot of the assistant tug b throttles down his engines somewhat until the coupling k comes against the plug h while the principal tug a advances to the corresponding extent relatively to the glider c, and the coupling k is released. Figure 2 shows the condition of affairs just after this release has been effected, with the length of cable f still attached to the assistant tug b. The assistant tug then diverges from the previous direction of flight and operates a release at m so as to discard the length of cable f, generally allowing it to fall within the area of the airfield from which the flight started. The length of cable g is still connected to the junction plate by the spigot member u engaging the plug member h so that the glider can be towed by the principal tug a, which continues in flight to tow the glider c to its destination. Couplings at n on the principal tug a and at o on the glider c are then released to discard the cables f and g and the junction plate d, with the bridle l connecting it to the glider.

Figure 3 shows the towing connections to a larger scale, indicating a suitable shackle connection at p for uniting the bridle l to the junction plate d, and plug terminals q on the ends of the bridle for engaging with the releasable couplings at o on the glider. Similar plug terminals are shown at r on the leading end of cable f, and at s on the leading end of cable e for engagement with the couplings at m and n respectively on the assistant tug b and the principal tug a. It is the coupling device at k and its method of release by contact with the plug member h which forms the principal feature of this invention.

Referring now to Figures 4 and 5 which show one form of this coupling, the loop on the end of cable f is engaged with the cross pin 12 which extends between the side cheeks 13 of the part 20 of the socket member k. One of these side cheeks also carries an electric terminal 14 for one of the leads of the intercommunication telephone, which leads are carried through the cores of all the cables and suitably inter-connected. A second terminal 15 is mounted in insulating bushes 16 fixed within the socket member. This terminal 15 carries a spring plunger 17 which, when the spigot u is engaged in socket k, makes contact with a member 18 in the head of the spigot u.

The body of the socket portion 20 is slotted to accommodate a pair of spring pawls 21 mounted on pivot pins 22 which pass through holes in the part 20 and are held in place by the screwing of the end portion 19 over part 20 where it forms a shroud around the pawls. Springs 23 draw the upper ends of the pawls 21 inwardly causing them to engage behind the shoulder at 24 on the spigot u. The pawls 21 have tail pieces 25 designed to balance them statically about their pivots 22 so that, when the coupling is being bumped and jolted over the ground during the take-off, there should be no risk that the jolts would cause either of the pawls to release its hold on the spigot u.

When the socket k comes into engagement with the plug member h as shown in Figure 6, the head end of the plug member presses back the pawls 21 disengaging them from the shoulder 24 on the spigot u and so allowing the socket to separate from the spigot u. This spigot then remains bearing against the end of plug member h to transmit the pull from the cables e and g to the junction plate d and so through the bridle l to the glider c. The engaging surfaces of the pawls 21 and the shoulder at 24 are so shaped that the pawls can be pressed apart over the face of the shoulder when under load.

Electric contact is made with one electric lead in the cable g by a spring thimble 18 suitably insulated as at 26 in the end of the spigot u, Figure 7, and arranged to bear against the spring plunger 17, while the other lead is connected to the outside of the spigot so as to make electrical connection with the socket k and so with the terminal 14. Figure 3 shows some of the electric leads drawn out from the ends of cables e and f and from the bridle l. The leads 27 and 28 at the ends of cables e and f nearest the plugs s and r may be connected to suitable terminals (not shown) in the tugs a and b, while the leads 29 on one limb of the bridle l are for connection to terminals (not shown) on the glider c, and leads 30 at the other end of the bridle are connected to terminals on the junction plate d from which electrical connections are made to cable g in a suitable manner forming no part of the present invention. The connections between the leads in cables g and e are made internally in the buffer t in a manner which also forms no part of this invention, but they can be connected in any other convenient manner.

Referring now to Figures 8 and 9, it is seen that the pulley v is pivoted on an axis y between two side plates of the junction plate d, and the cable g enters through a passage in a block w, embraces the pulley v, and emerges again through the hollow plug member h which is pivoted at x between the side plates. It is the block w against which the buffer t bears while the assistant tug is in action, and the plug member h against which the spigot u bears when the principal tug a is towing alone.

In the alternative form of coupling shown in Figures 10 to 12, the socket portion of the release mechanism consists of two jaws or half members 31 and 32 pivotally connected at the eyelet 33 which receives the looped end of the cable leading to the assistant tug b. Each of these half members or jaws 31 and 32 has a shelf or ledge in it at 33 for engaging under the disc or head 34 on the end of the cable g passing to the junction plate d. The insides of the jaws 31 and 32 are then formed with hook-shaped projections 36 adapted to engage an annular channel under a rounded head 37 on a tubular fitting 38 through which the cable g passes freely. This fitting 38 has a spring box mounted on it in the form of two telescoping members 39 and 40 with a spring 41 between them, one member 39 being screwed or otherwise connected to the tubular guide portion 38 extending from the rounded head 37, while the other portion 40 is pressed upwards toward the rounded head by the spring 41. When free, this portion 40 of the spring box is pressed by the spring into the annular groove of the rounded head 37 and extends outwardly therefrom so as to mask the groove and prevent any member from engaging with it until the part 40 of the spring box is pressed backwardly by hand against the action of its spring 41. The cable g again passes through a pivoted plug member h on the junction plate d which plug member has a rounded or ball-shaped head 42 serving to operate the release. This head portion in the present case serves to push up the fitting 38 having the rounded end 37 so as to release it from the projections 36 on the jaws 31, 32 of the socket member. When the head 37 is engaged with these jaws, their projections 36 entering the annular groove behind the rounded head 37 bear against the sliding telescoping portion 40 of the spring box, holding the spring 41 compressed so that the projections 36 are gripped between this part 40 of the spring box and the rounded head 37. If the spring were to fail in action, however, the engagement would still be effective so long as the coupling mechanism was under tension. When the assistant tug b is throttled down to allow its cable to run back toward the junction plate, the hinged member h with the rounded head 42 bears against the base of the fitting 38 and of the fixed part 39 of the spring box screwed thereon, pressing the fitting up toward the disc 34 on the end of the cable g. The rounded head 37 slides up between the inclined faces at 43 within the jaws 31 and 32, spreading the jaws as shown in Figure 11 until the disc 34 is free from the ledges at 33. As the jaws open their projections 36 move apart allowing the sliding portion 40 of the spring box to snap into position, occupying the groove behind the rounded head 37 so as to make sure that the projections 36 on the jaws cannot accidentally become re-engaged with the head 37. This action occurs before the jaws are spread widely enough for the shelves or ledges 33 to release the disc 34 connected to the cable g. The disc 34 on the cable g, when it is released, immediately falls back against the rounded head 37 which in turn is supported by the end 42 of the pivoted member h on the junction plate d, and the pull is transmitted via the junction plate from the cable e connected to the principal tug.

The above described examples of constructions according to the invention will suffice to illustrate its practical applications, and either form as in Figures 4 to 7 or Figures 10 to 12 may be used as may be found preferable according to the circumstances of any particular case. In the first described form the socket member k presents simple surfaces of revolution externally which are but little liable to damage on pulling over the ground or falling. In the second described construction the jaws 31, 32 of the socket member can separate when released, and although they will generally remain close together, they are perhaps rather more likely to be damaged by impact with the ground when falling.

In the construction of Figures 10 to 12 the end portions of the jaws 31, 32 may be made separately as shown, each as the half of a conical member so that the two parts, when the jaws are closed, fit closely together. These parts are welded at 44 to the pivotally connected parts of the jaws to form a unitary structure therewith. It is convenient to make these ends separately so as to give ready access thereto for shaping the engaging surfaces before the ends are welded on to the pivotally connected parts of the jaws.

It will be evident that the constructions described may be modified in several respects in either case without departing from the scope of the invention, but in all cases the device will include an actuating member such as h through which the cable g passes and against which a part of the coupling abuts to effect the release when it is required to disconnect the assistant tug from the junction plate or other attachment connecting the member to be towed so as to effect its release. Precisely similar conditions may arise when two marine tugs are pulling a single vessel and it may be required to release the connection to one of the tugs at short notice.

I claim:

1. A towing and releasing device for connecting two tugs to a load for towing and permitting one of said tugs to disengage its connection while in transit, comprising a junction plate including cable guiding means, a length of cable for extending from one of the tugs, a coupling comprising a first part secured to the end of the said cable, a second part and means securing the two parts together and releasable by entry of an actuating member into the first part, a second length of cable one end of which is attached to the second part of said two-part coupling and which movably passes over the guiding means on said junction plate, means for connecting the other end of said second length of cable to the other of said tugs, an actuating member on said junction plate adapted when engaging said two-part coupling to effect its release, and means for connecting said junction plate to the load to be towed.

2. A towing and releasing device for connecting two tugs to a load for towing and permitting one of said tugs to disengage its connection while in transit, comprising a length of cable for extending from one of said tugs, a coupling comprising a first part connected to the free end of said cable and a second part releasable from the first part by entry into it of an actuating member, a junction plate including cable guiding means, a second length of cable one end of which is attached to the second part of said two-part coupling and which passes over the guiding means on said junction plate, means for connecting the other end of said second length of cable to the other of said tugs, a buffer on said second length of cable between said other tug and said junction plate adapted to engage a part of said junction plate and to limit the movement of said second length of cable over said guiding means on the junction plate in one direction of relative movement, an actuating member on said junction plate through which said second length of cable passes to the second part of said two-part coupling, said actuating member and coupling being adapted to co-operate to release said coupling by pressure between them when said second length of cable is pulled over said guiding means on the junction plate to the limit of its movement in the direction opposite to that which keeps said buffer in engagement with said junction plate, and means for connecting said junction plate to the load to be towed.

3. A coupling and releasing device comprising a two-part coupling one element of which is of socket form, and the other element of spigot form, a plurality of pawls and means for pivotally supporting them in the first mentioned part of said coupling, a shrouding portion rigidly fixed to said first part of the coupling around said pawls adapted to protect them against contact with external objects, said second element of the coupling being formed with surfaces for engagement by said pawls, and a plug member adapted to enter into the shroud and first portion of the coupling and to engage said pawls in a direction such as to disengage them from said second element.

4. A coupling and releasing device as claimed in claim 3 wherein said element of the coupling which is of socket form is in two parts, the first part of which is slotted to accommodate said pawls and has passages therein for receiving the pivotal supporting means for said pawls, said shrouding portion in turn being screwed on the first part of said coupling and embracing said pivotal supporting means and said pawls.

5. A coupling and releasing device as claimed in claim 3 wherein said element of the coupling which is of socket form has an electric contact terminal therein, and said element of the coupling which is of spigot form has an insulated contact terminal therein adapted for engagement by said contact terminal on the first mentioned element of said coupling when said two parts of the coupling are in mutual engagement.

6. A coupling and releasing device comprising a two-part coupling one element of which consists of a pair of pivotally connected jaws, each jaw having a ledge and a hook-shaped projection on its inner face, while the other element of said coupling consists of a head member adapted to engage said ledges, and a tubular fitting shaped for engagement with said hook-shaped projections, in combination with a releasing element comprising a plug member adapted to press said tubular fitting inwardly between said jaws in a direction such as to disengage it from said hook-shaped projections, said tubular fitting and said jaws having co-acting surfaces adapted to separate said jaws when said tubular fitting is moved in the direction for disengaging it from said hook-shaped projections.

7. A coupling and releasing device comprising a two-part coupling one element of which consists of a pair of pivotally connected jaws, each jaw having a ledge and a hook-shaped projection on its inner face, while the other element of said coupling consists of a head member engaged with said ledges, and a tubular fitting engaging with said hook-shaped projections, spring means urging the tubular fitting axially in a direction to maintain its engagement with the said projections, the said tubular fitting being arranged for contact by a releasing element comprising a plug member adapted to press said tubular fitting inwardly between said jaws such as to disengage it from said hook-shaped projections, said tubular fitting and said jaws having co-acting surfaces adapted to separate said jaws when said tubular fitting is moved in the direction for disengaging it from said hook-shaped projections.

8. A towing and releasing device for connecting two tug aircraft to a single towed glider aircraft at the start of a flight, and to enable one of said tug aircraft to release its connection while in flight, the said device comprising a length of cable and a buffer element secured thereto at one end, a two-part coupling, a second length of cable with one part of said two-part coupling secured thereto at one end thereof, a third length of cable extending from said buffer element and having the other part of said two-part coupling secured to its other end, a junction plate with a pulley thereon around which said third length of cable passes, means for connecting said junction plate to the glider aircraft, an abutment on said junction plate for engagement by said buffer element, and a plug member through which said third length of cable passes to said second part of the two-part coupling, said coupling and plug member being adapted to co-operate for disconnecting the two parts of said coupling by pressure between said coupling and said plug member.

9. In a towing and releasing device adapted for connecting and releasing connections between lengths of cable; in combination, a junction member provided with cable-guiding means, a towed cable movable in the said guiding means, a plug extending axially of the cable from the junction member, a coupling device comprising an element carried by the end of the said cable, a second element for attachment to a towing rope and means connecting the two elements together and releasable by entry of a releasing device into the element carried by the end of the said cable, means for securing the towed cable against forward movement in the guide under pulling force exerted by the towing rope and with the coupling device spaced away from the plug, and means for drawing the cable rearwardly through the cable-guiding means to move the coupling device toward the junction member and enter the plug into it to effect release of the connecting means.

10. An automatically releasing towing gear for air-towed loads, comprising, in combination, a sheave; a rope passed about the sheave and adapted to be secured at one end to one of two tractor airplanes; a releasing device secured to the other end of the rope; another rope secured to the sheave and adapted to be attached to the towed load; and a third rope attached to the releasing device and adapted to be secured to a second tractor airplane; said releasing device gripping the said other end of the first mentioned rope and releasing it automatically when the releasing device is permitted to contact the sheave.

MARCEL JULES ODILON LOBELLE.

REFERENCES CITED

The following references are of record in the file of this patent:

UNITED STATES PATENTS

| Number | Name | Date |
| --- | --- | --- |
| 158,227 | Ward | Dec. 29, 1874 |
| 326,040 | Kemerer | Sept. 8, 1885 |
| 1,016,619 | Froger | Feb. 6, 1912 |
| 1,426,563 | Gariglio | Aug. 22, 1922 |
| 1,929,869 | Hassner | Oct. 10, 1933 |
| 2,124,867 | Akerman | July 26, 1938 |